United States Patent [19]

Israel

[11] Patent Number: 5,697,587
[45] Date of Patent: Dec. 16, 1997

[54] DEVICE FOR COOLING DRINK BOTTLES AND CANS IN THE CAR

[76] Inventor: Chermoni Israel, 20 Shoham St., Haifa, Israel

[21] Appl. No.: 479,207

[22] Filed: Jun. 7, 1995

[30] Foreign Application Priority Data

Jun. 23, 1994 [IL] Israel ........................... 110110

[51] Int. Cl.[6] ................................................. A47G 29/00
[52] U.S. Cl. .................... 248/214; 248/302; 248/311.2
[58] Field of Search ............................ 248/311.2, 214, 248/302; 224/926, 483

[56] References Cited

U.S. PATENT DOCUMENTS

| | | | |
|---|---|---|---|
| 898,755 | 9/1908 | Little | 248/311.2 |
| 1,086,541 | 2/1914 | Lailer | 248/311.2 |
| 1,276,905 | 8/1918 | Hall | 248/311.2 X |
| 2,302,737 | 11/1942 | Bearden | 248/311.2 X |
| 2,518,538 | 8/1950 | Giblin | 248/311.2 X |
| 2,532,244 | 11/1950 | Pasmore | 248/311.2 X |
| 3,314,635 | 4/1967 | Frye | 248/311.2 |
| 4,303,109 | 12/1981 | Cohen | 224/483 X |
| 4,852,843 | 8/1989 | Chandler | 248/311.2 |
| 4,997,156 | 3/1991 | Allen | 248/311.2 |
| 5,165,646 | 11/1992 | Gewecke | 224/483 X |
| 5,540,409 | 7/1996 | Cunningham | 224/926 X |

*Primary Examiner*—Joanne Silbermann
*Attorney, Agent, or Firm*—Lowe, Price, LeBlanc & Becker

[57] ABSTRACT

A holding device for positioning a beverage container adjacent an air conditioning outlet within an automotive vehicle to obtain a cooling effect includes a cup holder for holding the container and a grip, attached to the holder, which is connected to the air conditioner grill covering the outlet. The grip is preferably made of flexible metal wire formed with a U-shaped gripping area to be wrapped around the air conditioner grill, an intermediate area for adjusting the can to an optimal position, and a securement area which is adapted to be gripped in the cup holder.

9 Claims, 20 Drawing Sheets

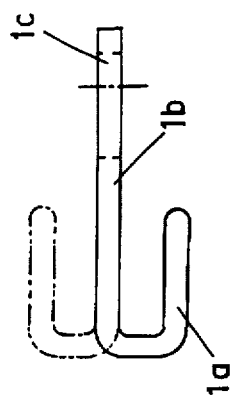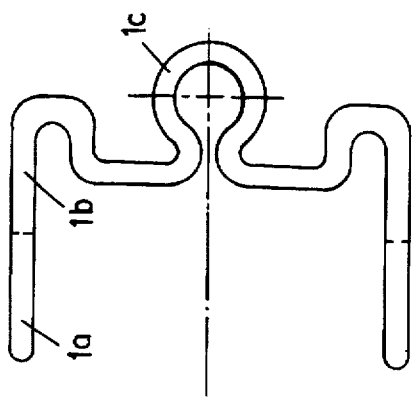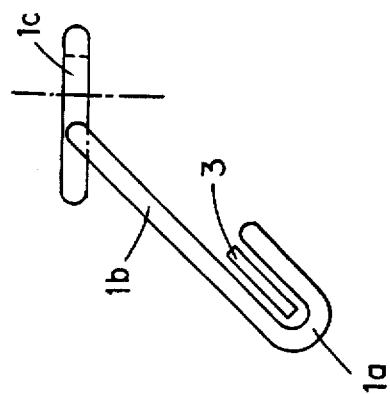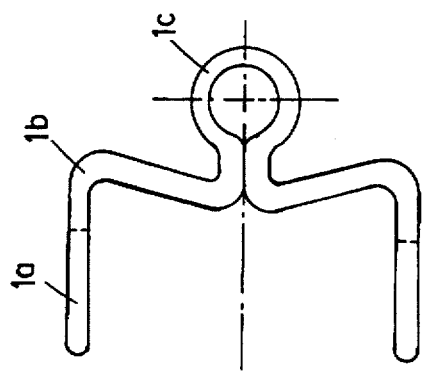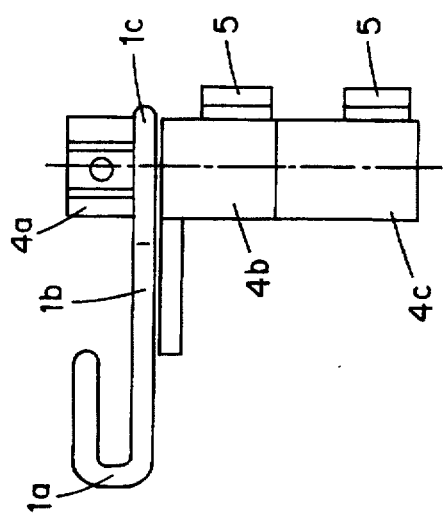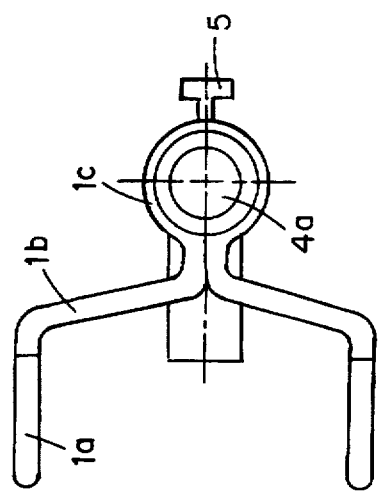

DEVICE FOR COOLING DRINK BOTTLES AND CANS IN THE CAR

FIELD OF THE INVENTION

The present invention relates to a device for cooling drink bottles and cans in the car.

More specifically, the present invention relates to a device for cooling drink bottles and cans by the air conditioning in the car, comprised of a grip which grips onto the air conditioner grill, and a cup for the holding of the can, which is connected to the grip, or to any other connecting body.

BACKGROUND OF THE INVENTION

A driver, or passengers, of a vehicle occasionally have a need for a cold drink. Cars have air conditioning systems, and by holding the cans of drink near the air conditioner opening, the drink will cool. Any holding device for the cans of drink has to catch strongly into the car, otherwise the movement of the car will cause the can of drink to fall. It is also essential for the device to be easily moved or connected according to the needs of the driver. Today, many articles are attached to the car with a magnet. This is neither stable nor secure, and in vehicles where the panel is not made of metal, a magnet is completely useless. Conversely, there are ways of connecting articles to the vehicle with bolts, but these can't be attached or removed with any sort of ease. The device, according to the present invention, can be attached and removed with ease, and according to necessity, but nevertheless is secure and stable when it is attached.

The belt place to connect cans of drink in the vehicle, which is almost never used, is the opening walls of the air conditioner, and the grills that change the direction of the flow of air in the air conditioner.

In the U.S. Pat. No. 4,852,843 a cylinder for cans of drink is described that catches, by means of two hooks, on the grills of the air conditioner for cooling. The inadequacy in this patent is the connection to the grills because in the course of driving, the cylinder which is not attached securely, jumps, moves about, and is generally noisy because the connection is not firm, but rather hanging and insecure.

The device according to the present invention will overcome these problems of the can jumping around, and will situate the drink cans in the optimal place for cooling.

SUMMARY OF THE INVENTION

The present invention relates to a device for cooling cans of drink by the air conditioner of the car, comprised of; a grip which grips onto the air conditioner grill, and a cup which holds the can of drink connected to the grip, or to a different attachment body, which is connected to the grip, wherein the grip is made of a partially flexible metal wire with a shape which is not affected by the weight of the can but with force of hands can be bent in the right places for the purpose of exact adjustment of the can to an angle, position and optimal steadiness in front of, and adjacent to, the air conditioner opening, and wherein the metal wire is comprised of three main parts and they are the gripping area, designed in the shape of the letter "U" wrapped around the air conditioner grill, and an area for the purpose of adjusting the can to optimal position, and an area which is gripped in the cup or in a connecting device to the cup, and wherein the cup has an opening and a volume for steady and convenient gripping of the drink can, and in its walls many openings allowing cold air currents from the air conditioner for cooling the drink can, and in its sides grooves and nodules, for connecting to the grip.

In a preffered embodiment of the invention the metal wire is wrapped with a plastic material. The holding and gripping area of the grip to the air conditioner is made up of two parallel bends in a "U" shape of the two ends of the metal wire. The gripping area to the holding in the metal wire may be made up of two parallel bends in an "L" shape, or a mirror image of it connecting them. It is possible to change the length of the arms, or the angle of said "L" shape when necessary.

The adjustment area of the metal wire is in a "Z" shape wherein both its angles can be changed for the purpose of exact and convenient adjustment of distance and angle of the body caught from the horizontal plain of the dash board, while allowing the mounting of the bottom bending end onto the dash board for the purpose of increasing stability. The metal wire may be connected to a connecting body and said body is connected to the holding cup, and wherein the metal wire is caught and wrapped in a circle or loop around the axis of the connecting body.

Said connecting body may be a tubular axis with two opposite screws, right and left. The connecting body may have two gripping and supporting arms perpendicular to the tubular axis and screwed onto the tubular axis with a right screw, and a left screw.

The gripping and holding area of the metal wire in the holding cup may be designed so that the metal wire rises upwards in the form of two parallel wires which close in a blanced connection at the top.

In a preffered embodiment in said two parallel wires rising upward there is a bend which projects outward for gripping in the hole situated in the holding cup.

DETAILED DESCRIPTION OF THE INVENTION

The invention will be described in detail in FIGS. 1–33. The following description does not intend to limit the scope of the invention, but only to clarify it. Following is a short description of the figures:

FIG. 1 describes the device according to the invention, in side view, in mode A when it is connected to the air conditioner grill.

FIG. 2 describes the device according to the invention, in side view, in mode A with an angle change of the grip.

FIG. 3 describes the device according to the invention, in an over side view, in mode A (as described in FIG. 1).

FIG. 4 describes the device according to the invention, in side view, in modification $A_1$.

FIG. 5 describes the device according to the invention, in side view, when it is connected to the air conditioner grill in mode B.

FIG. 6 describes the device according to the invention, in side view, when it is connected to the air conditioner grill in mode B.

FIG. 7 describes the device according to the invention, in over view, in mode B as described in FIG. 5.

FIG. 8 describes the device according to the invention in side view, in mode $C_1$.

FIG. 9 describes the device according to the invention, in side view, in mode $C_2$.

FIG. 10 describes the device according to the invention, in side view, in mode $C_3$.

FIG. 11 describes the device according to the invention, in over view, in mode $C_3$.

FIG. 12 describes the device according to the invention, in side view, in mode D connected to the air conditioner grill.

FIG. 13 describes the device according to the invention, in over view, in mode D connected to the air conditioner grill.

FIG. 14 describes in side view mode D of the grip connected to the connecting body.

FIG. 15 describes in over view mode D as described in FIG. 14.

FIG. 16 describes in side view a possibility of place change of the body of the connection in mode D, by bending the grip.

FIG. 17 describes the grip in over view as described in FIG. 16.

FIGS. 18 and 19 describe in side view and over view respectively, a possibility of design for the grip in mode D.

FIG. 20 isometrically describes the possibility of another mode E of the grip and the body of the connection.

FIG. 21 describes the detailes of FIG. 20 in side view.

FIG. 22 isometrically describes another mode $E_1$ of the and the connecting body.

FIG. 23 describes the device according to the invention, in side view, in mode F.

FIG. 24 describes the device according to the invention, in over view, in mode F.

FIG. 25 describes the grip according to the invention, in side view, in mode G.

FIG. 26 describes the grip in side view, in mode $G_1$ in "locked" position.

FIG. 27 describes the grip in side view after moving to "open" position.

FIG. 28 describes the grip in side view in mode G when it is gripped onto the air conditioner grill.

FIG. 29 describes the grip in side view in mode $G_1$ when it is gripped onto the air conditioner grill when the air conditioner grill is tilted to a convenient drawing position.

FIG. 30 describes the device, according to the invention, in position $G_1$ when it is gripped onto the air conditioner grill.

FIG. 31 isometrically describes the cup which holds the can of drink.

FIG. 32 isometrically describes the grip in mode H which fits to catch on the cup according to FIG. 26.

FIG. 33 isometrically describes the cup which holds the drink can according to the invention.

FIG. 34 describes in side view the grasping element of the bottle grip.

FIG. 35 describes the same grasping element in over view.

FIG. 36 describes the double edged hook.

FIG. 37 also describes the grasping part of the same bottle grip from a side view, from a different angle.

FIG. 38 describes an example the bottle grip in side view, when assembled in the device, as described in FIG. 8.

Figure 39:
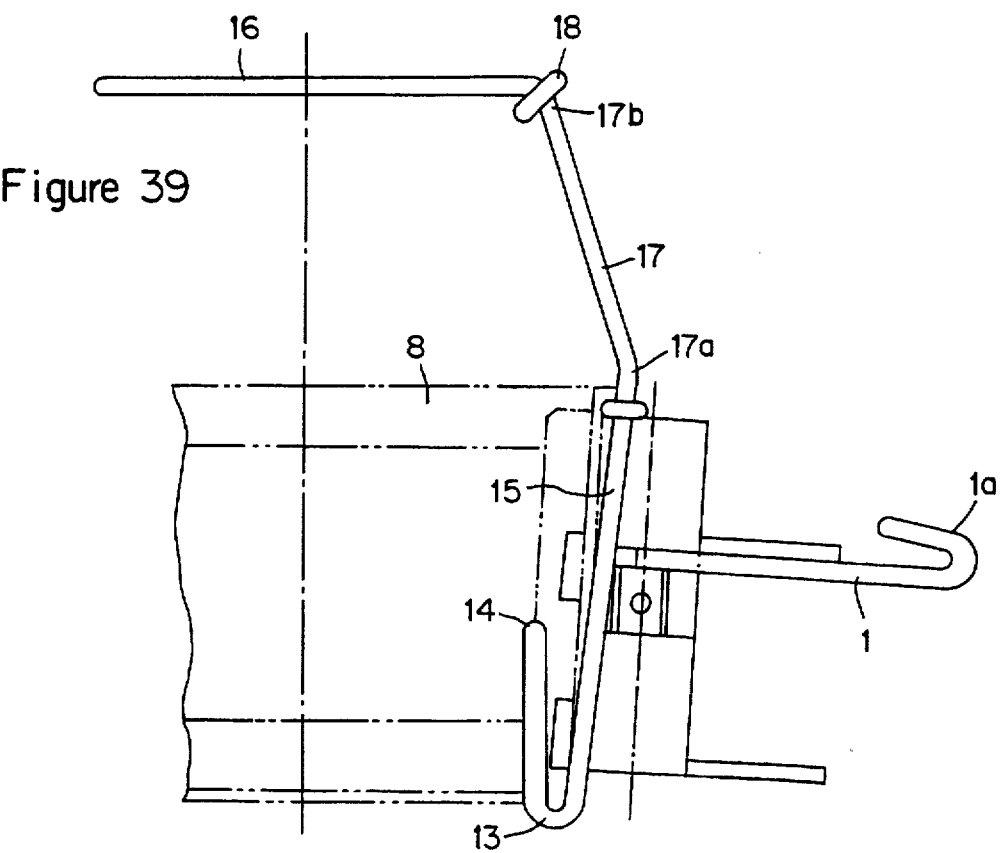

FIG. 39 describes in side view another example of assembly of the same bottle grip in the device, according to the invention.

Figure 40:
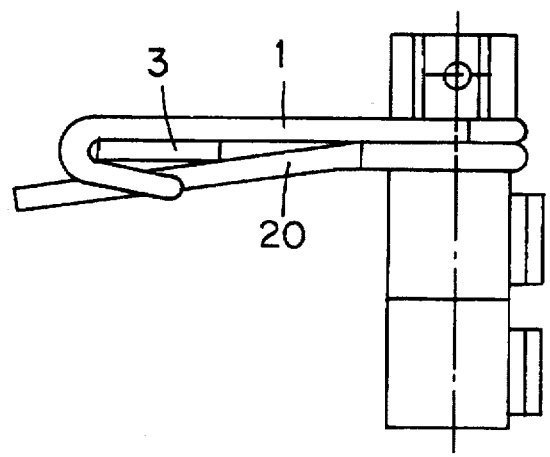

FIG. 40 describes in side view a possibility of firm and steady grasping of the air conditioner grill bar (4) with the connecting body.

Figure 41:
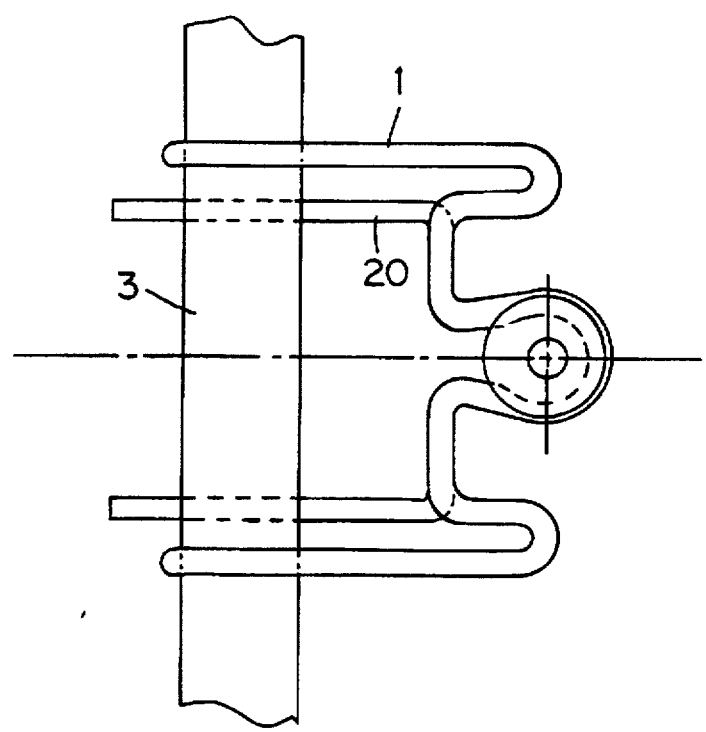

FIG. 41 describes in over view the mode described in FIG. 40.

Figure 42:
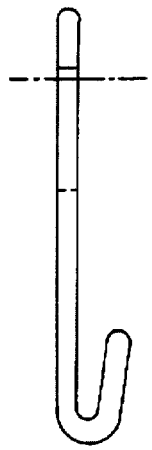

FIG. 42 describes the grip (1) in side view.

Figure 43:
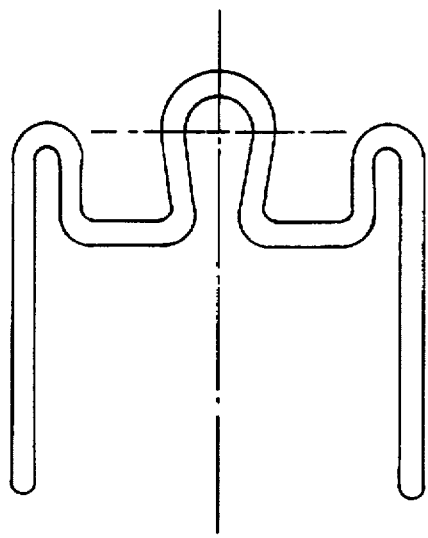

FIG. 43 describes the grip (1) in over view.

Figure 44:

FIG. 44 descibes the grip (20) in side view.

Figure 45:
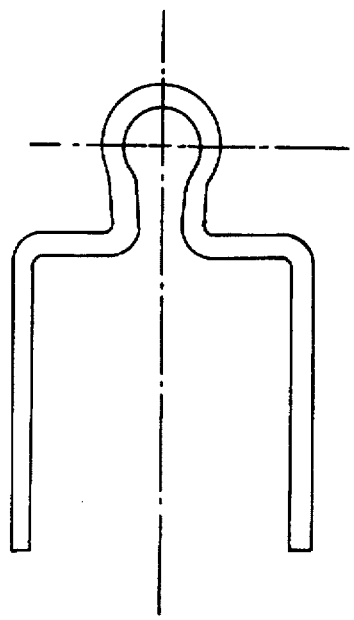

FIG. 45 describes the grip (20) in over view.

Figure 1:
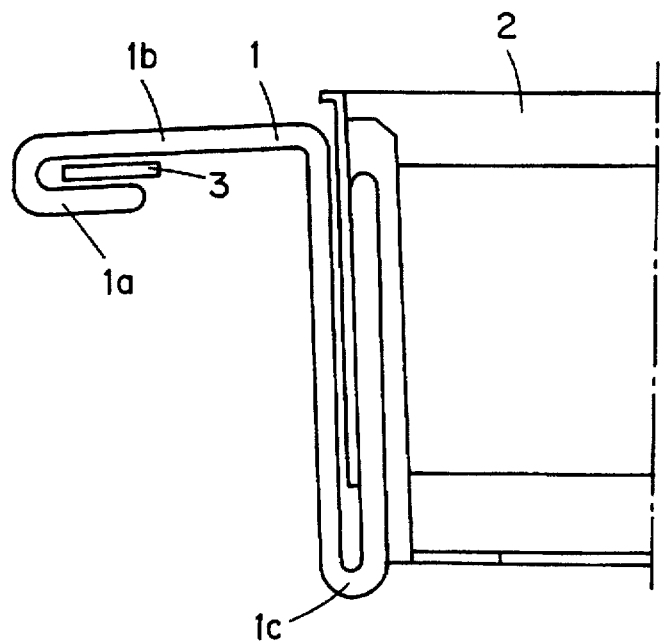

Following is a detailed description of the figures:

FIG. 1 describes a mode herein to be called mode A, in side view. The device is comprised of a grip (1) and a cup (2) in which is placed the drink can. The shape and size of the cup is fitted according to the shape and size of the drink can. The grip is made of a partially flexible metal wire, with three areas in it. A "U" shape area (1a) in which the grip is gripped around the air conditioner grill (3), an area for fitting the optimal position and angle of the cup in relation to the air conditioner opening (1b), and a "U" shaped area in which the cup is gripped (1c). The three areas are comprised of two parallel wires connected in balance in the area of the cup, as described in FIG. 2. The metal wire of the grip is flexible enough to change the angle of the cup in relation to the air conditioner with the user's force of hand, but steady enough to maintain its shape under the weight of the drink can and the shaking of the car.

Figure 2:
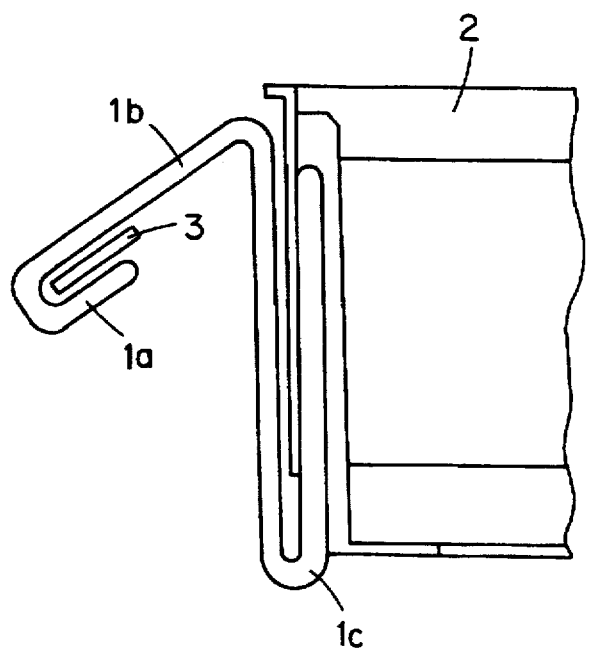

FIG. 2 describes the device in mode A in side view, as illustrated in FIG. 1, but in an angle change in the grip, in order to fit itself to the angle of the air conditioner grill (3).

Figure 3:
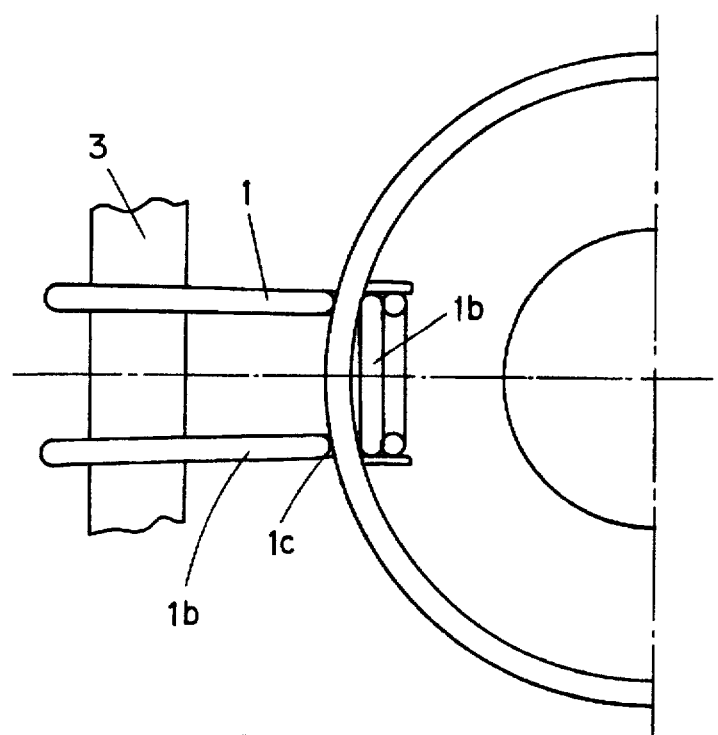

FIG. 3 describes the device according to the invention, in over view, in mode A (described in FIG. 1) when connected to the air conditioner grill. The grip (1) grips around the air conditioner grill (3). The grip is comprised of partially hard metal wires with an identical design, connected in parallel and in balance in the cup area (1d), and opening in the sides of the cup allowing insertion of the "U" shaped area in which the cup is gripped (1c) into the cup. The area (1b) of the grip allows for slight change of position and angle of the cup to optimal position in relation to the air conditioner opening.

Figure 4:
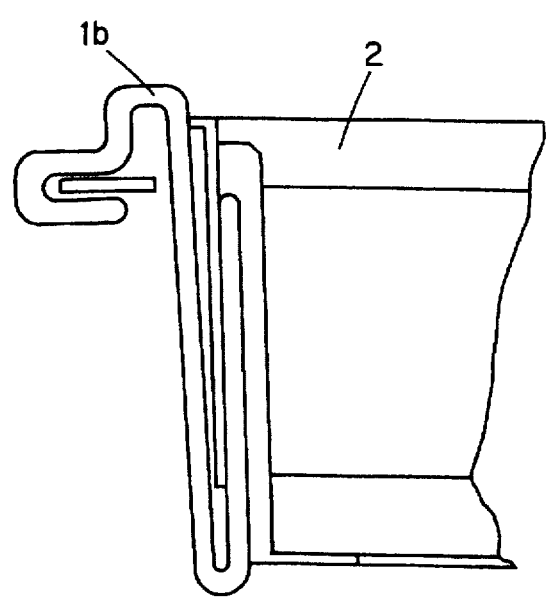

FIG. 4 describes the device, according to the invention, in side view in mode $A_1$. The mode is as follows: in the area of adjustment and positioning of the grip, there is a bump (1b) allowing, by changing its angle, to position the cup (2) in relation to the air conditioner opening.

Figure 5:
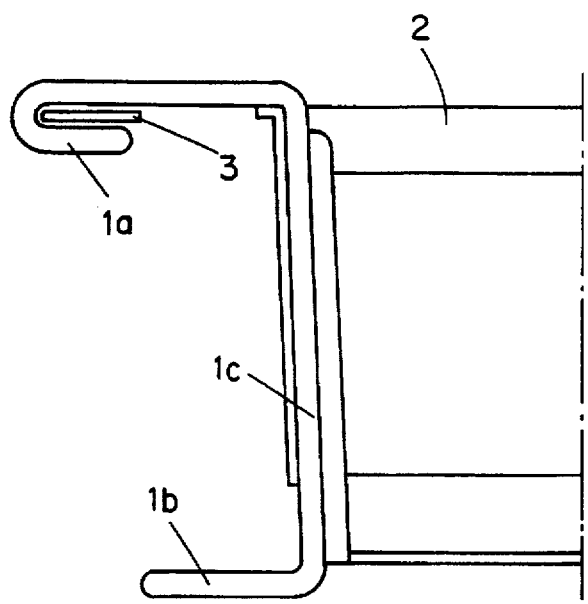

FIG. 5 describes the device according to the invention, in side view, in another mode, herein called mode B, when connected to the air conditioner grill. The area (1a) of the grip, shaped as a "U", wraps around the grill (3), the area (1b) of the grip leans on its edge on the dash board, and by changing angle, the cup (2) can be adjusted to the desirable angle in relation to the air conditioner adjusted to the desirable angle in relation to the air conditioner opening. The area (1c) of the grip is the area in which the cup connects and grips onto the grip.

Figure 6:
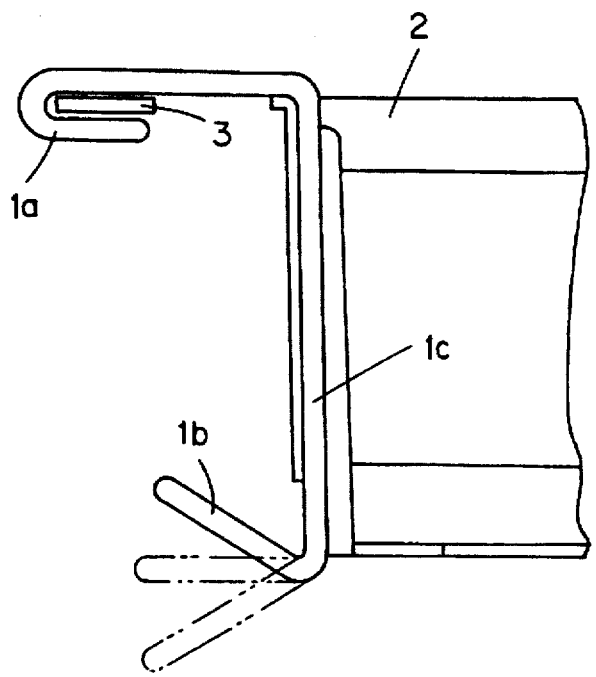

FIG. 6 is a side view of the same B mode of the invention, which illustrates the possibility of bending of area (1b) which leans on the dash board.

Figure 7:
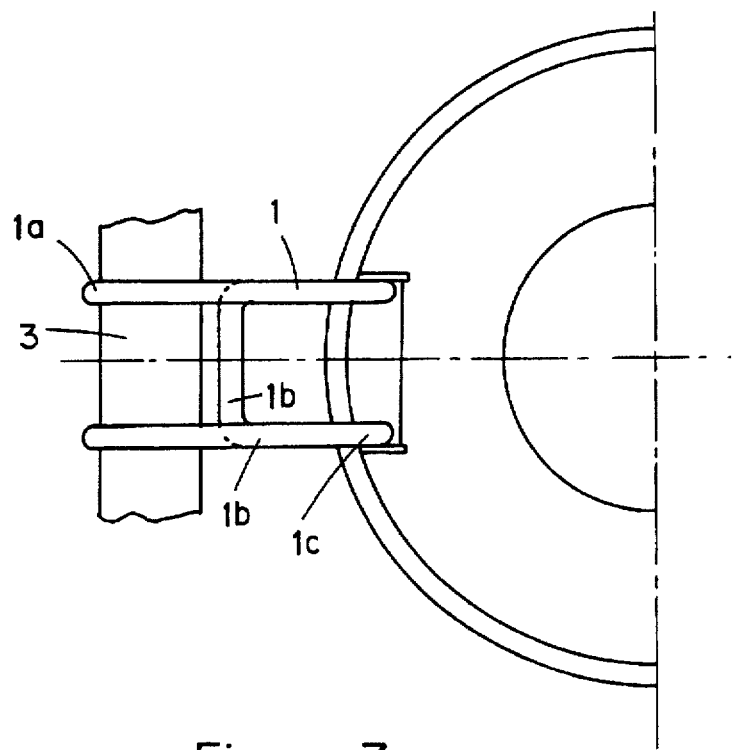

FIG. 7 describes the details of FIG. 3 in over view. The grip (1) in area (1a) grips around the air conditioner grill (3), and grips onto the cup in area (1c). Wherein in area (1b) by changing its angle in relation to area (1c) allows to adjust the cup to the optimal angle. The grip is designed of two parallel parts connected horizontally in area (1d).

Figure 8:
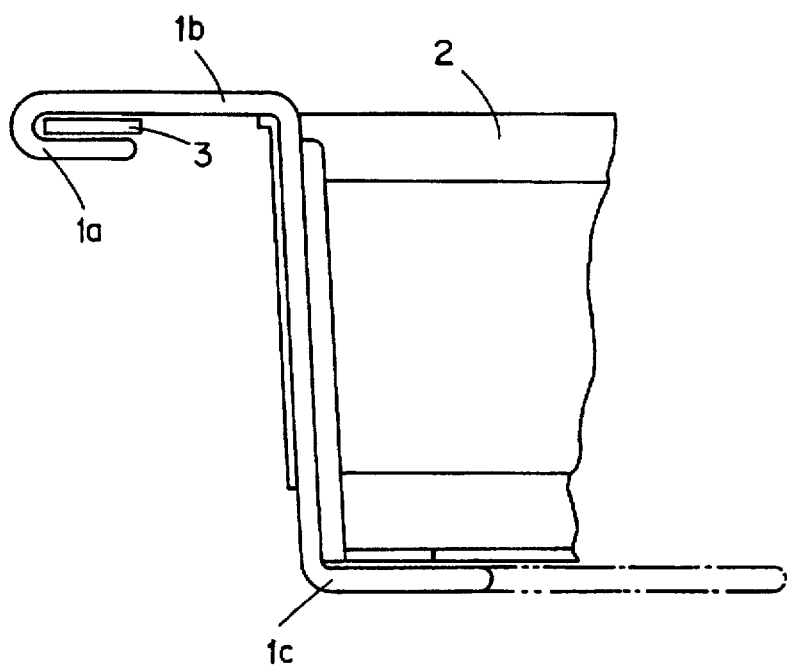
Figure 10:
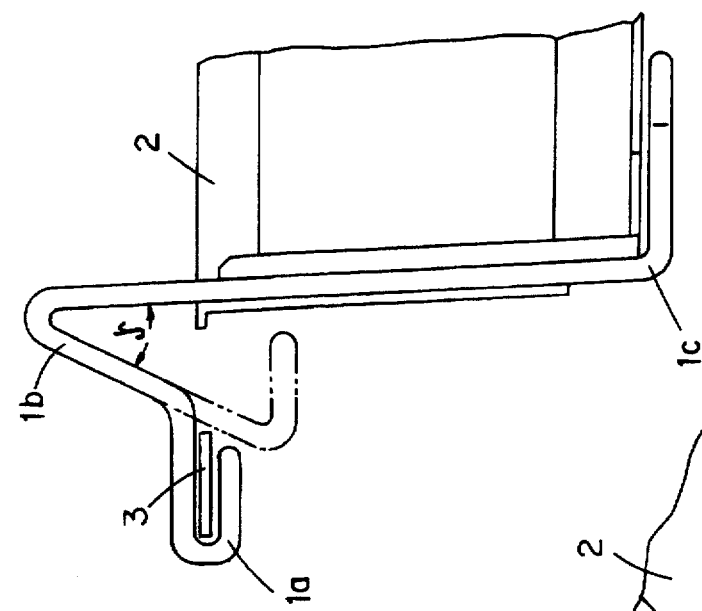
Figure 9:
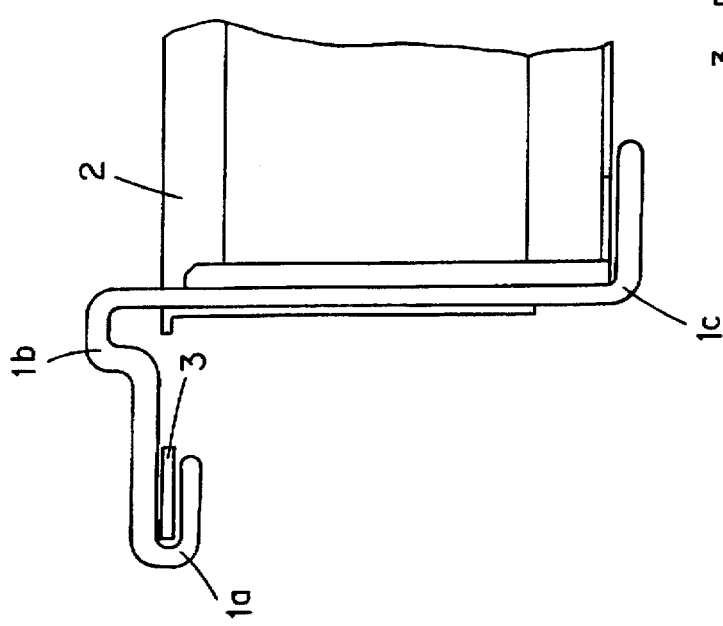

FIGS. 8, 9, 10 and 11 describe a mode of the device, herein called mode C, in three positions $C_1$, $C_2$ and $C_3$. In this mode, area (1c) of the grip connected to the cup, is shaped as the letter "L", and area (1b) of the grip, used for adjusting the cup in relation to the air conditioner opening, has a bump (nodule) pointing upwards in positions $C_2$ and $C_3$ (FIGS. 9 and 10).

FIG. 8 describes the device in side view in mode $C_1$. The grip in area (1a) wraps around the grill (3). The area (1b) is for fitting the optimal position and angle of the cup in relation to the air conditioner opening. The area of the grip (1c) is an "L" shape, and is used for holding the cup (2) on top of the grip.

The height of the cup (2) in relation to the air conditioner opening can be adjusted by changing angle α in area (1b). The grip is gripped in area (1a) onto the air conditioner grill.

FIG. 9 describes mode $C_1$ of the device in side view, according to the invention. The grip in area (1a) wraps around the grill (3). In the area of adjustment and positioning of the grip there is a bump (1b) allowing, by changing of its angle, to position the b cup (2) in relation to the air conditioner opening. The area of the grip (1c), in an "L" shape, is used for the holding of the cup (2) on top of the grip.

FIG. 10 describes the device in side view, as described in FIG. 5 with one change. The bump (1b) is higher and allows to bring the cup (2) closer, and adjacent to the dash board by changing angle τ (see broken line (1c)).

Figure 11:
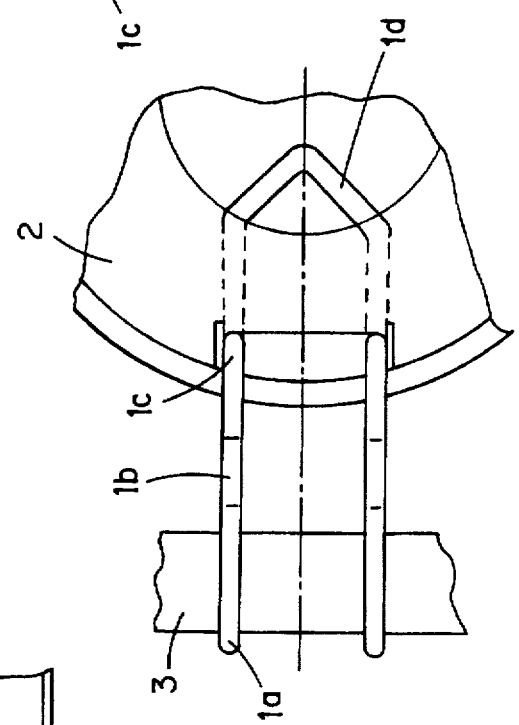

FIG. 11 describes the device in over view as described in FIG. 6 when connected to the grill. As in the previous modes, the grip is connected to the grill (3) in area (1a), and the cup (2) in area (1c), in a parallel set of designs connected under the cup horizontally (1d). The bump (1b) allows to move the cup closer to, and further away from the air conditioner opening.

Figure 12:
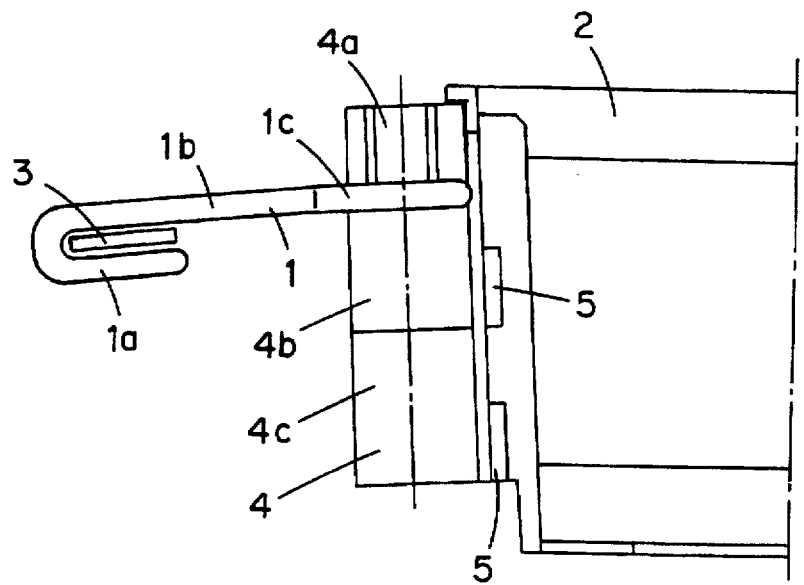

FIG. 12 describes the device in side view, according to the invention, when connected to the air conditioner in a mode herein called mode D. The grip (1) is connected in area (1a) to the the grill (3) and the connecting body (4) in area (1c). Between areas (1a) and (1c) the grip has an adjustment area (1b). The connecting body connects the grip and the cup (2) with nodules (5) inserted through a groove on the side of the cup. The connecting body (4) is comprised of an axis, a screw with a right screw and a left screw and head (4a). Two bodies (4b) and (4c) are screwed onto the screw, one with a right screw and the other with a left screw. Each body has a nodule (5) inserted into the groove on the side of the cup. Between the head of the screw (4a) and the body (4b) a loop (1c) of the grip is inserted which attaches them by turning the head of the screw.

FIG. 3 describes in over view the details describes in FIG. 8 wherein area (1a) of the grip wraps around the air conditioner grill (3). The area (1b) of the grip is an adjustment area of the distance and angle of the cup (2) to the air conditioner opening. The loop (1c) is used for insertion, and the connecting body has a connection (5) which connects the grip and the cup.

Figure 13:
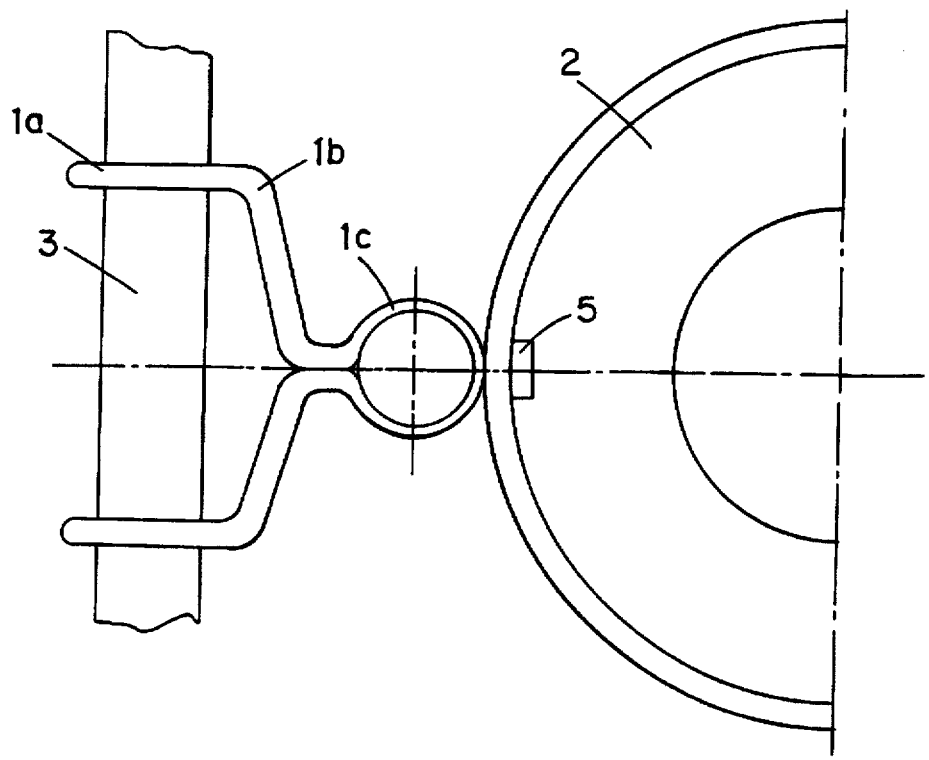

FIGS. 14–22 describe the details described in FIGS. 12 and 13 with slight changes.

FIGS. 14 and 15 describe the grip connected to the gripping body, as described in FIGS. 12 and 13 (in mode D), except that in area (4b) there is an arm which operates as an arm for steadying the grip. FIG. 14 describes the grip connected to the connecting body in side view, and FIG. 15 describes the grip connected to the connecting body in over view.

FIGS. 16 and 17 describe the grip in said mode D in side view and over view respectively. The grip is bent towards the air conditioner in area (1b) thus the cup is closer to the air conditioner opening. In addition, by bending and changing the vertical angle it is possible to adjust the air conditioner openings (3) in an angle as described in FIG. 16.

FIGS. 18 and 19 describe in mode D in side view and in over view respectively, another development of the grip in the adjustment area (1b). The bends in this area allow much more flexibility in bending and bringing the cup closer to the air conditioner. In addition this connection allows (as in previous variations, but in easier fashion) connection of the grip to the air conditioner grill, wherein the grill is vertical by turning of the loop (1c) to a horizontal position and gripping the connecting body and the cup verticaly.

Figure 20:
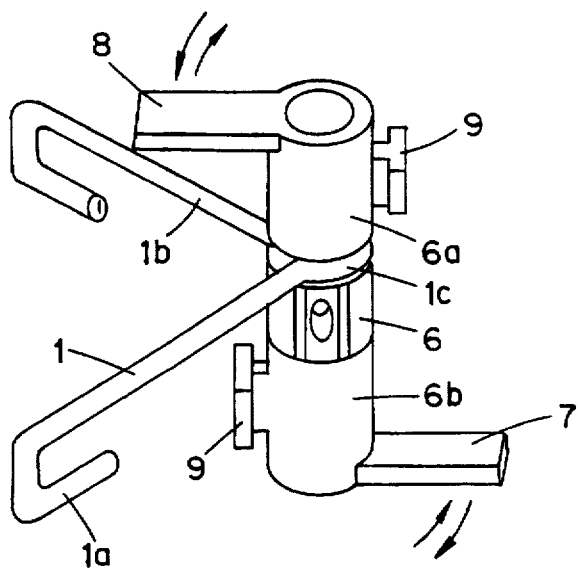
Figure 21:
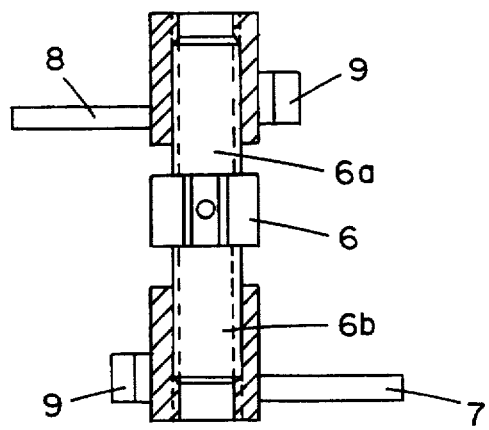

FIGS. 20 and 21 describe isometrically and in side view, respectively, another variation of the connecting body which connects the grip and the cup.

FIG. 20 isometrically describes the connecting body (6) when connected to the grip (1). The connecting body is comprised of a screw (6) with a right and left screw, on which is screwed a body in right screw (6a) and left screw (6b), wherein to each screwed body is connected an arm which is perpendicular to the axis and is used to hold the can from underneath (7) and/or to insert into the air conditioner grill for further steadiness (8). These arms can be turned around the screwing axis, and by being turned they are distanced or brought closer to each other according to necessity. On the other side of each arm is a nodule (9) for the connecting of the cup through a lengthwise groove.

FIG. 21 describes in side view the connecting body described in FIG. 20, with one difference. The screwed section (6a) onto the upper screw, was screwed on in reverse so that the arm is situated in the lower section. A similar reversing can be done also in section (6b). All for the purpose of optimal adjustment for the connection to the air conditioner grill or for leaning on the dash board, and the steadying of the cup at a fitting hight.

Figure 22:
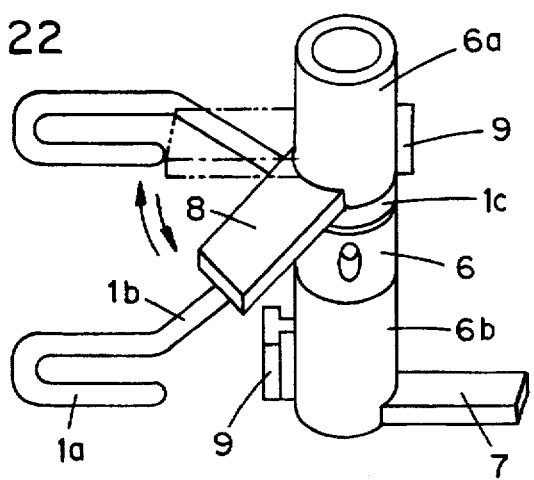

FIG. 22 isometrically describes the connecting body described in FIG. 20. Wherein the ability to turn the pependicular arm according to necessity, is emphasized. Wherein the arm is turned towards the dash board and leans on it, allowing further steadiness of the cup to vertical position.

Figure 23:
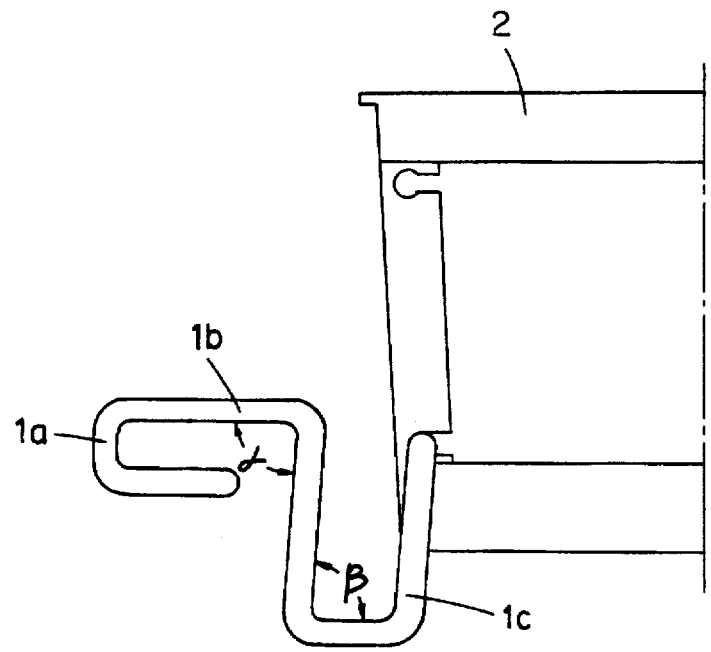
Figure 24:
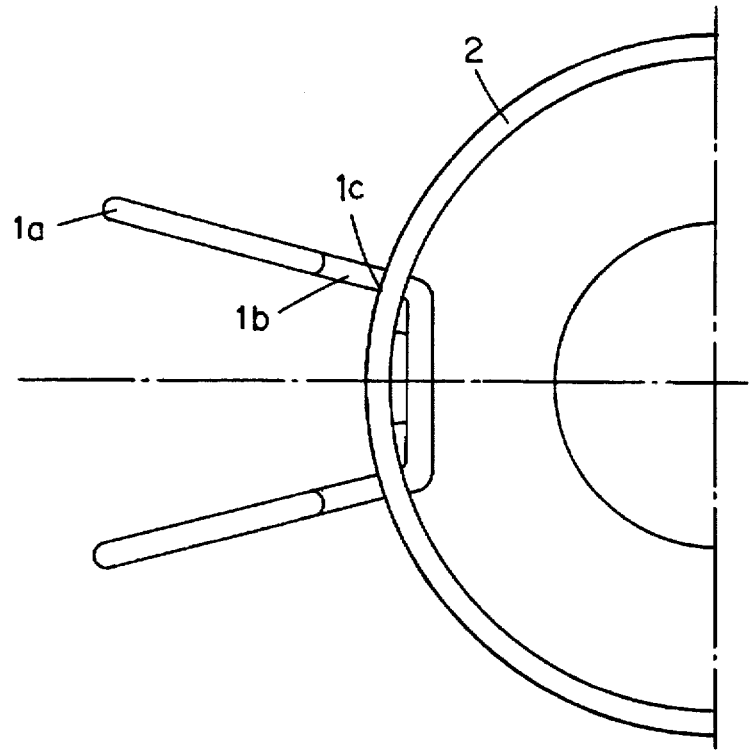

FIGS. 23 and 24 describe the device in side view and over view respectively, in a mode herein called mode F.

FIG. 22 describes the device according to the invention. The grip (1) is connected to the cup (2) with a connecting area in the grip to the air conditioner grill in a "U" shape (1a) with a connecting area of the grip to the cup (1c) and an adjustment area (1b) by bending and changing angles α and/or β.

FIG. 24 describes in over view the device described in FIG. 23.

Figure 26:
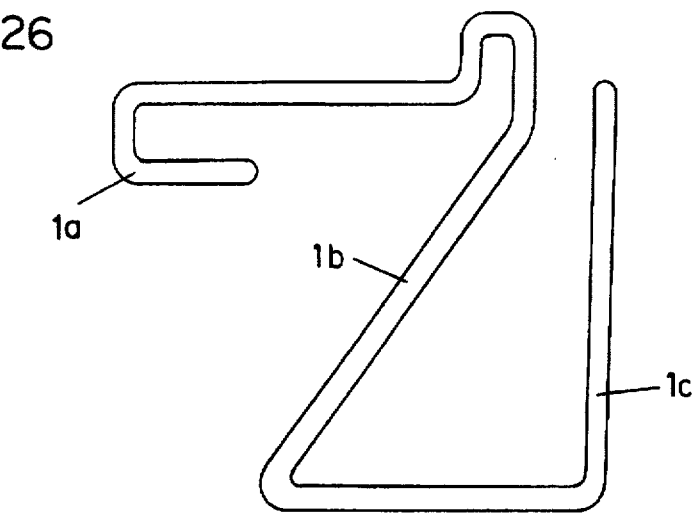
Figure 25:
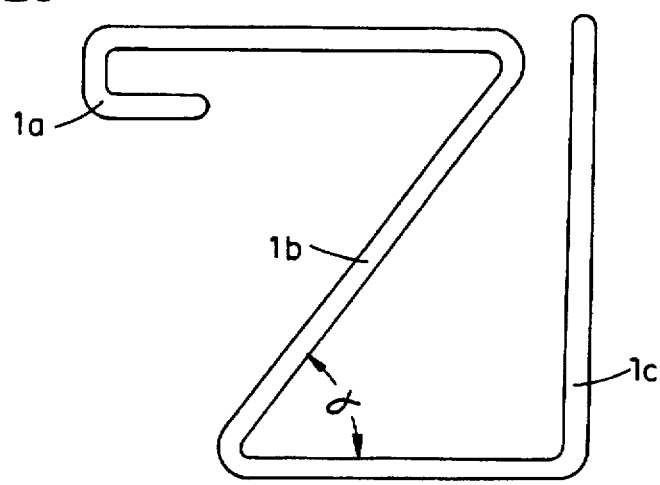
Figure 27:
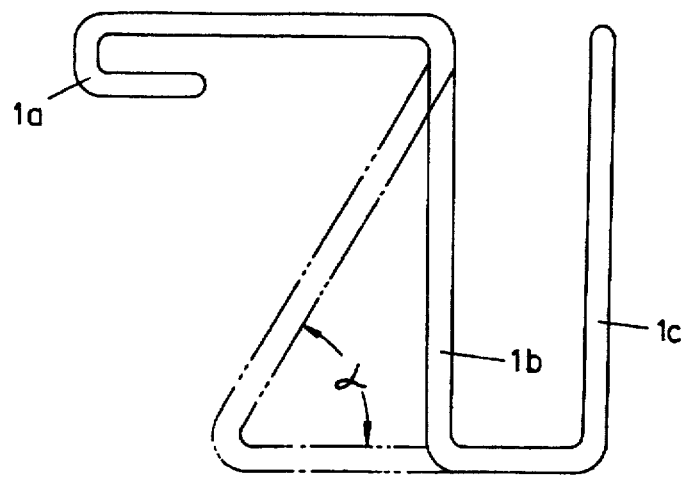

FIGS. 25, 26 and 27 describe the grip in side view in a mode to be called herein mode G, in three different positions.

FIG. 25 describes the grip with areas (1a), in mode G, for the gripping of the air conditioner grill, and area (1b) with a "Z" shape for adjusting the position of the cup from the air conditioner opening, and an area (1c) for connecting the grip to the cup.

FIG. 26 describes a grip completely identical to the grip in FIG. 25, except for a bump in area (1b). (mode $G_1$)

FIG. 27 describes in side view the grip described in FIG. 25 after bending and changing of angle α. This is an "open" position in which it is possible to remove the device from the air conditioner grill. The description in FIG. 22 is of a "closed" position in which the can is connected onto section (1c), and the bend in the area of angle α touches the dash board, and thus steadies the cup and prevents its shaking during the ride.

Figure 28:
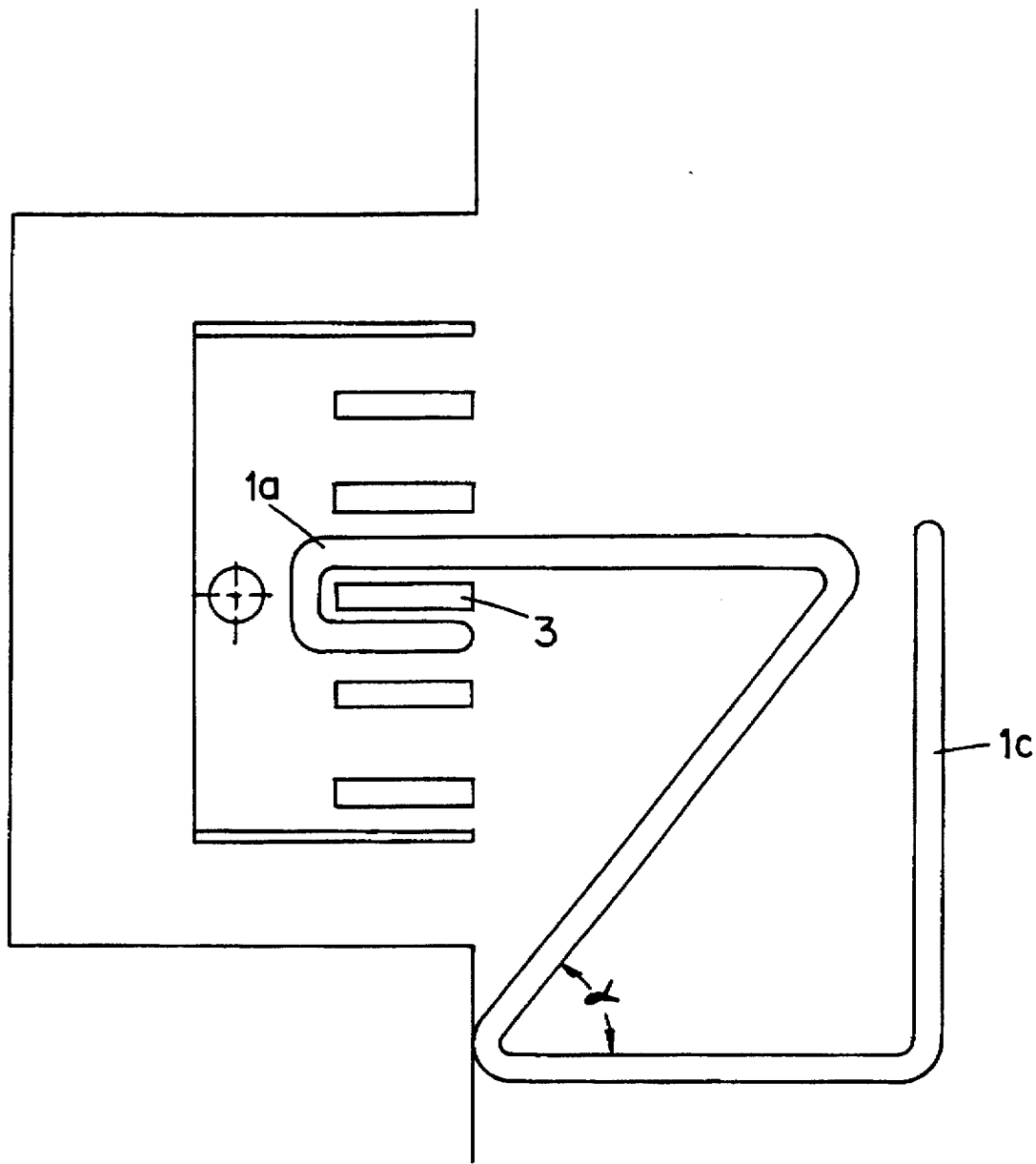

FIG. 28 describes in side view the grip described in FIG. 25, when on one side it is connected to the grill (3) in its area (1a), and in the bending area of angle α it leans on the dash board for steadiness. The area (1c) of the grip is used for connection to the cup.

Figure 29:
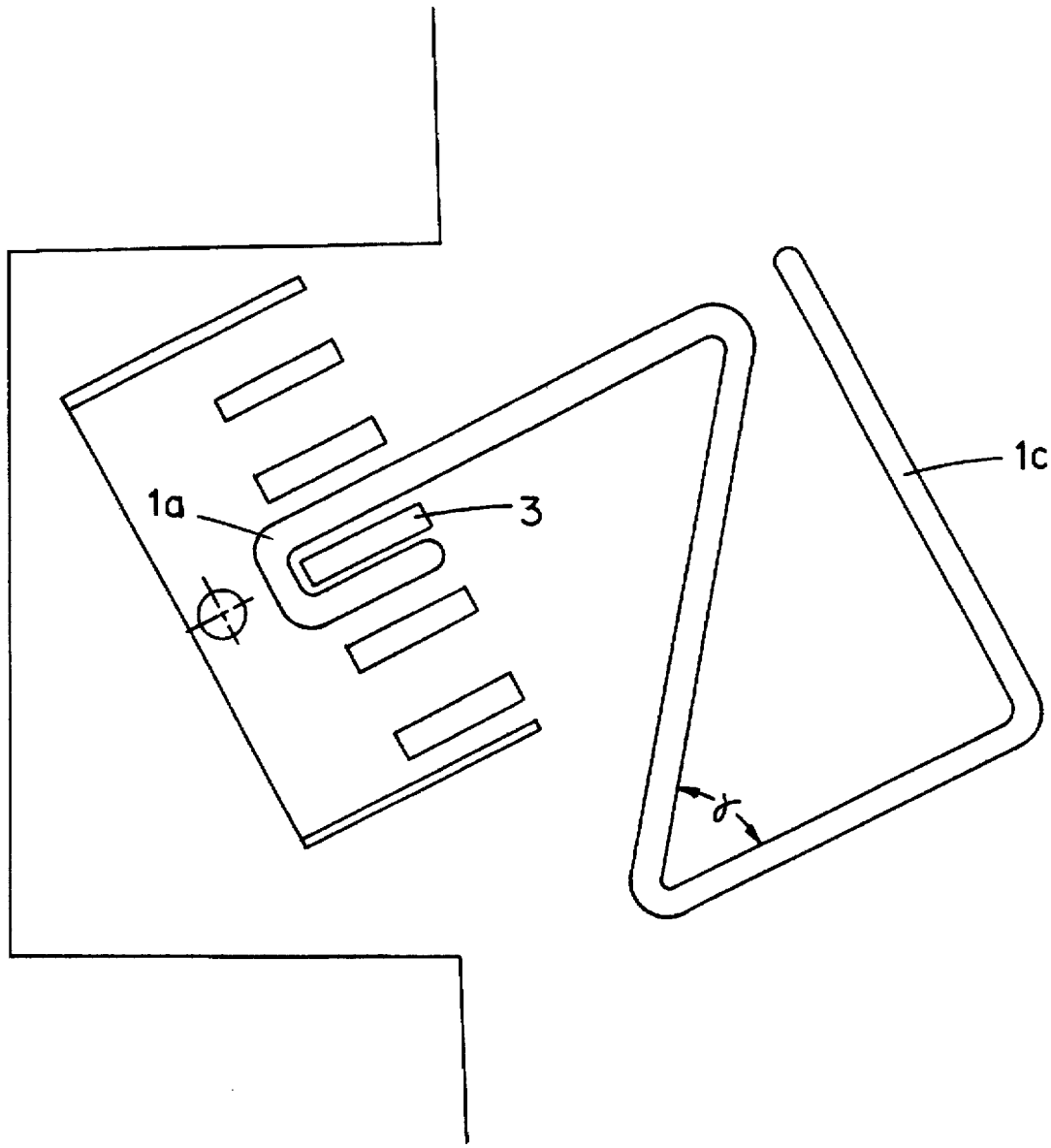

FIG. 29 describes the grip in side view in mode G when gripped to the air conditioner grill, which tilts at a convenient position for drawing.

Figure 30:
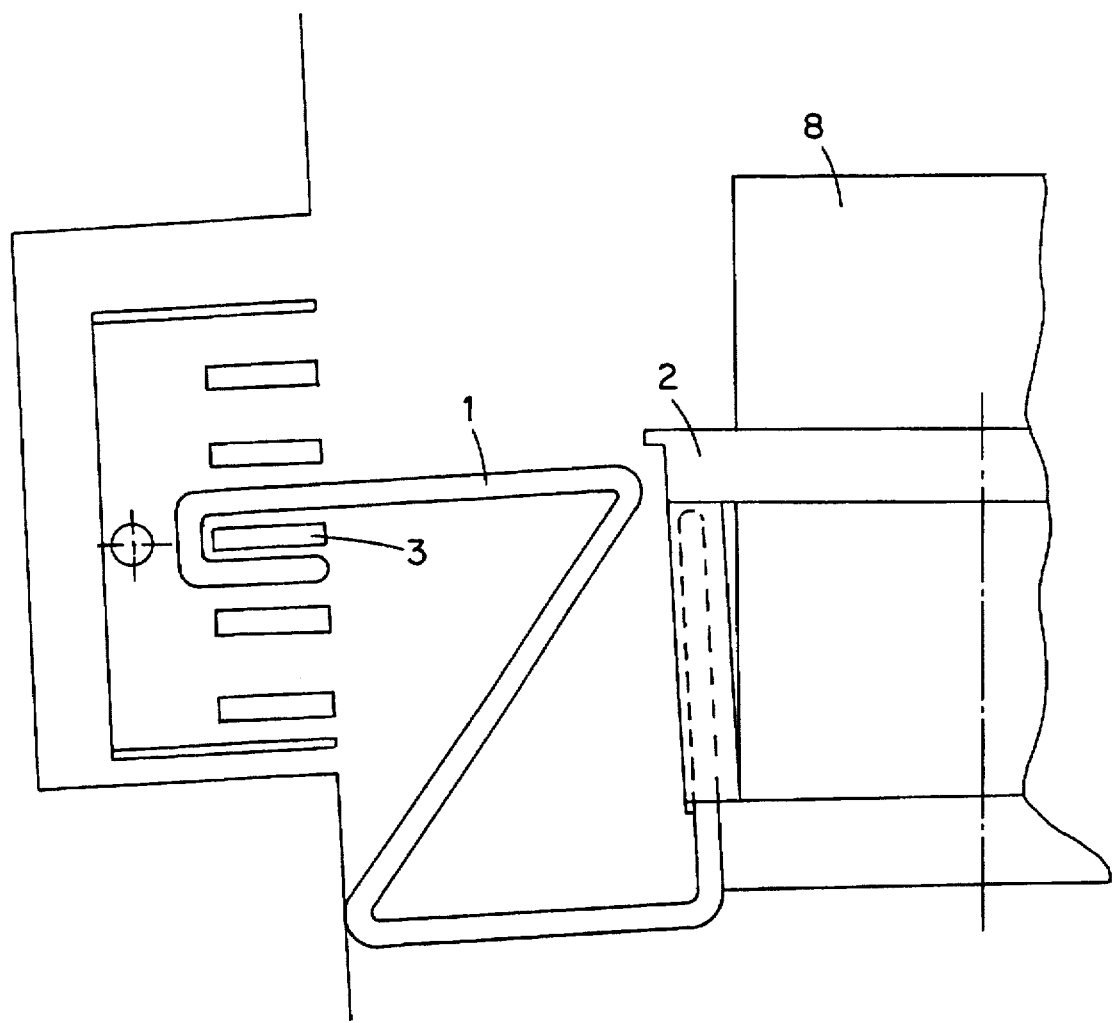

FIG. 30 describes the device in side view, according to the invention, in mode G when gripped on the air conditioner grill (3) and wherein a drink can (8) is situated inside the cup (2) which is connected to the grip (1).

Figure 31:
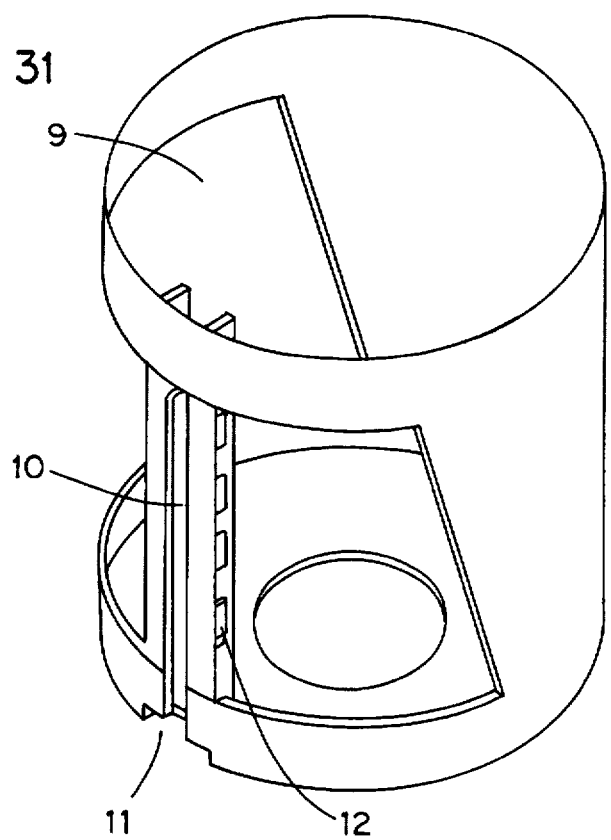

FIG. 31 isometrically describes the cup which holds the drink can. This cup is an important part of the device according to the invention, and has openings (9) to allow the cold air from the air conditioner to reach the sides of the drink can. The drink can is inserted and positioned inside the cup through the upper opening of the cup. A lengthwise groove (10) passes along the side of the cup with a side opening at its bottom (11) which allows for insertion of the edge of the grip intended for connection, or to be inserted into a fitting nodule of the connecting body. The holes (12) at the sides of the connecting area allow use of the connector in mode H described in FIG. 28.

Figure 32:
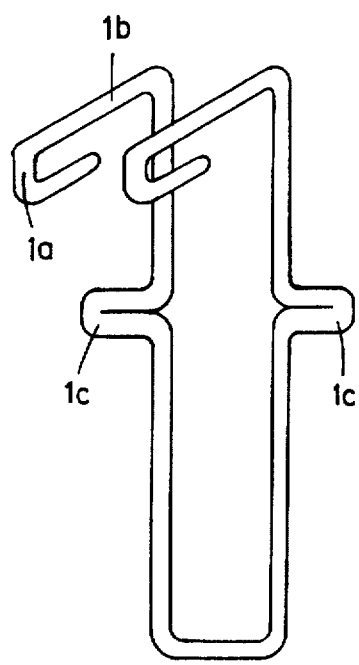

FIG. 32 isometrically describes a grip in a mode herein to be called made H. The area (1a) is used to grip the air conditioner grill. The area (1b) is used for adjustment of the cup angle by changing angle α. The nodules (1c) in the verticle area which insert into the cup, grip in the holes (12) mentioned in FIG. 31. It is possible by opening the proper holes to adjust the height of the cup in relation to the air conditioner opening.

Figure 33:
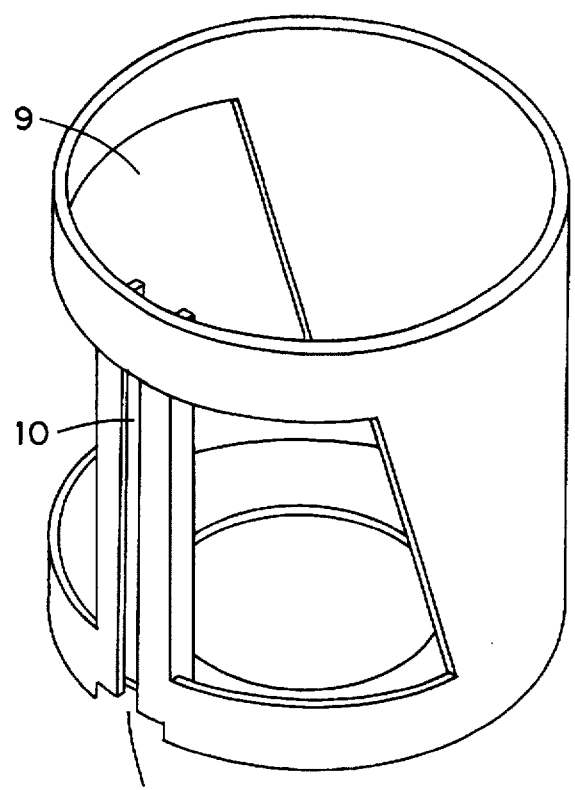

FIG. 33 isometrically describes another example of a cup for the holding of a drink can. This time with no holes on the sides in the connecting area.

The invention relates also to the device, having a grip for holding and grasping tubular objects with changing circumferances (such as drink bottles) which are put inside the cup (herein after called "bottle grip"). The bottle grip includes a grasping wire, and a catching hook (herein after called a "double edged hook").

Figure 34:
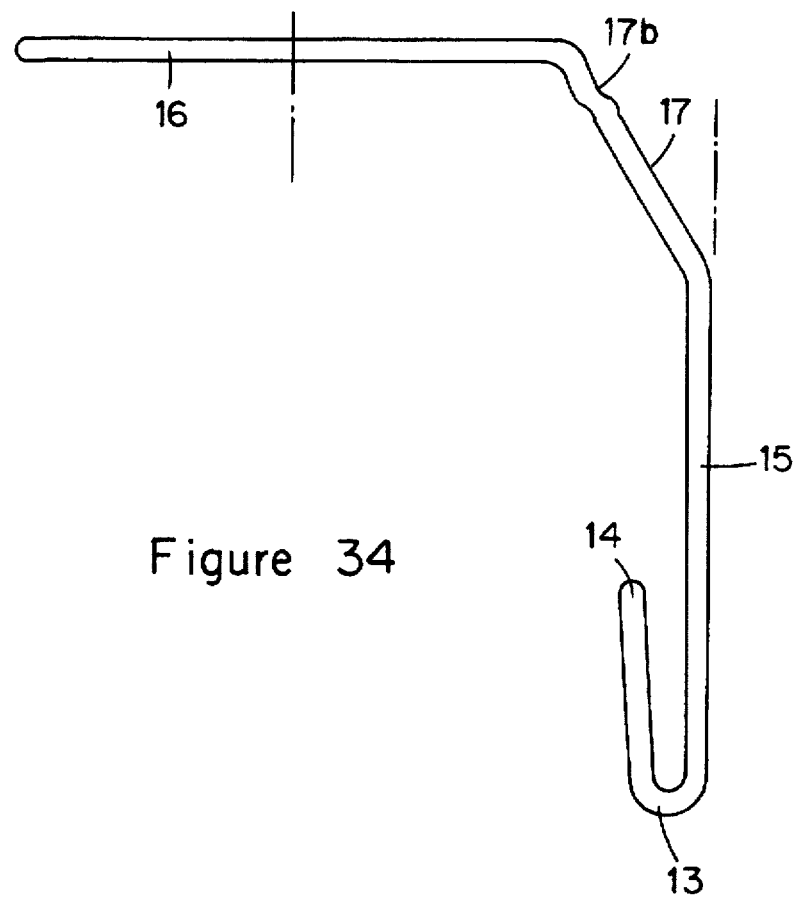

FIG. 34 describes in side view the grasping element of the bottle grip. It is made of a partially flexible metal wire, and catches onto the bottom of the cup by inserting into a groove located on the bottom of the cup. It's shape on the bottom is "U" shaped (13), and the edge (14) is inserted into a groove at the bottom of the cup. It's central part (15) rises upwards, along the external part of the cup, and then opens above the cup into two arms (16) which create a circle over the upper opening of the cup, with a changeable circumferance (with a hook) for grasping tubular products with a changing circumferance placed inside the cup (such as bottles).

The "angular" area (17) is used to slide the double edged hook (to be described in FIG. 36) along it, thus changing the cicumferance of the circle which creat the arms. Slight bending in area (17b) locks the hook into place in a steady manner.

Figure 35:
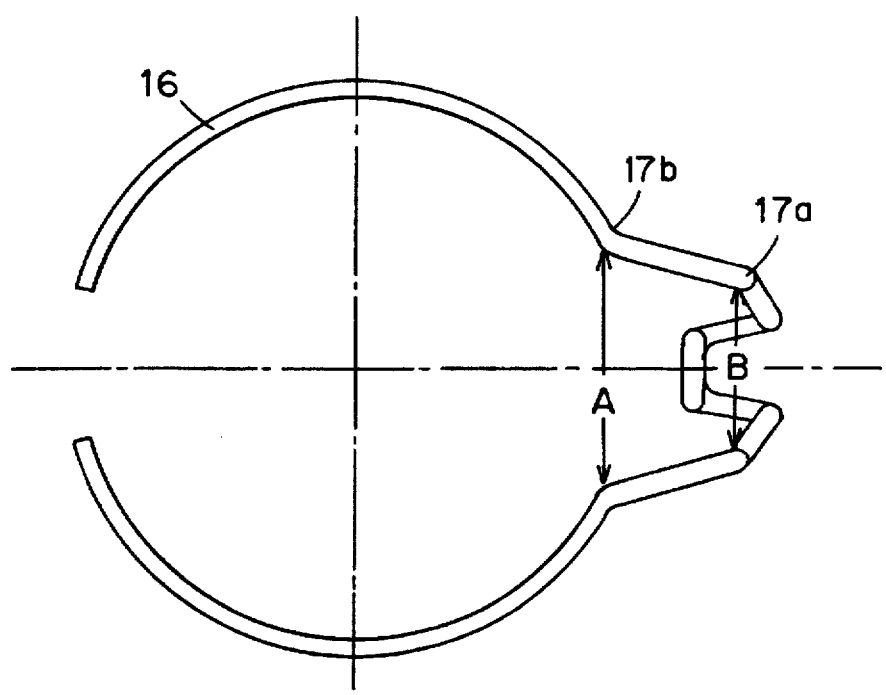

FIG. 35 describes the same grasping element in over view. The arms (16) grasp the body or neck of the bottle at any area with a permanent or changing circumferance. The changing of the arm's circumferance is done by establishing the placing of the double edged hook (FIG. 36) between parts (17a) and (17b).

Figure 36:
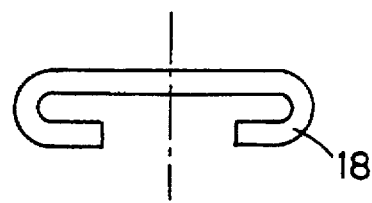

FIG. 36 describes the double edged hook (which is an integral part of the bottle grip). The double edged hook also is made of metal wire, and is simply a straight section which ends with two hooks (18). These hooks catch onto part (17) of the grasping part, and can slid between points (17a) and (17b). The difference between the distances, marked in FIG. 35 as A and B, are what cause the closing and opening movement of the arms (changing the circumferance of the circle they create) while sliding the double edged hook along them. This double edged hook also helps to combine said bottle grip with the grip used to connect to the air conditioner grill.

Figure 37:
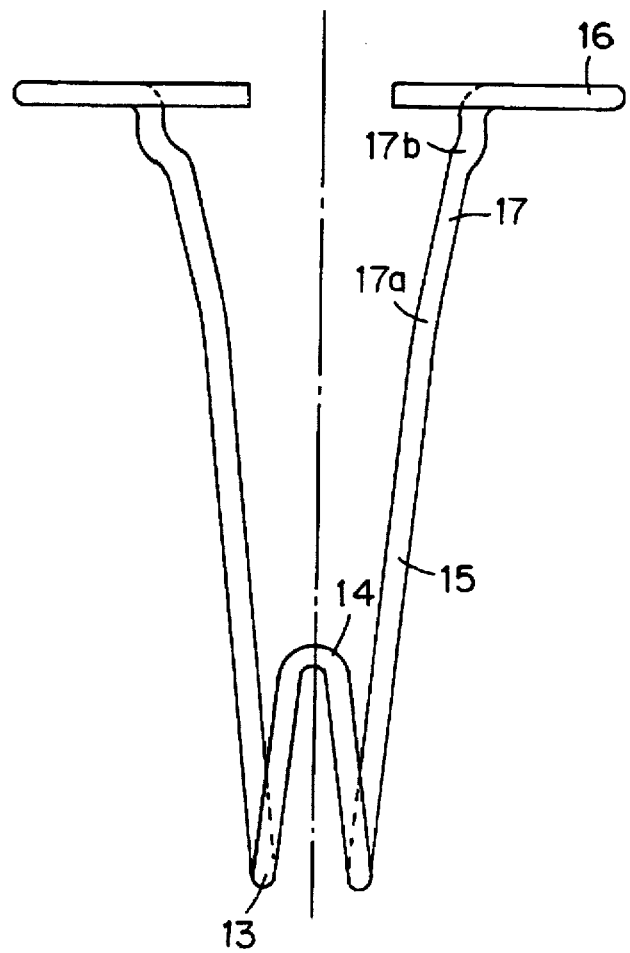

FIG. 37 also describes the grasping part of the same bottle grip from a side view, from a different angle.

Figure 38A:
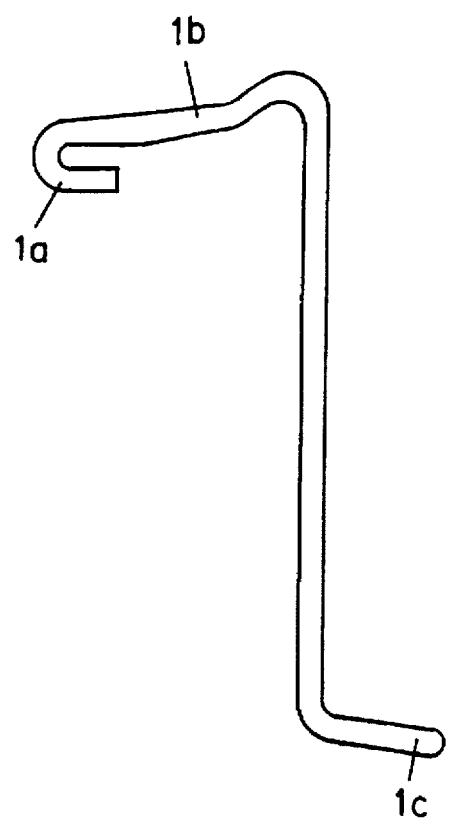
FIG. 38a depicts in side view the grip.
Figure 38B:
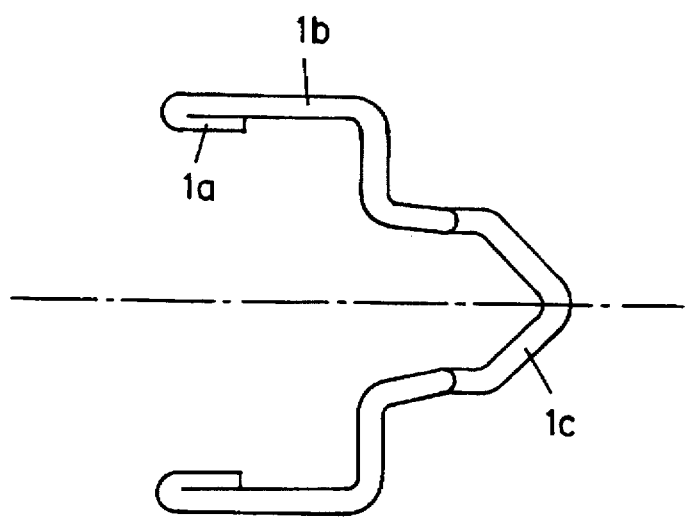
FIG. 38b depicts the grip of FIG. 38a in over view.
Figure 38:
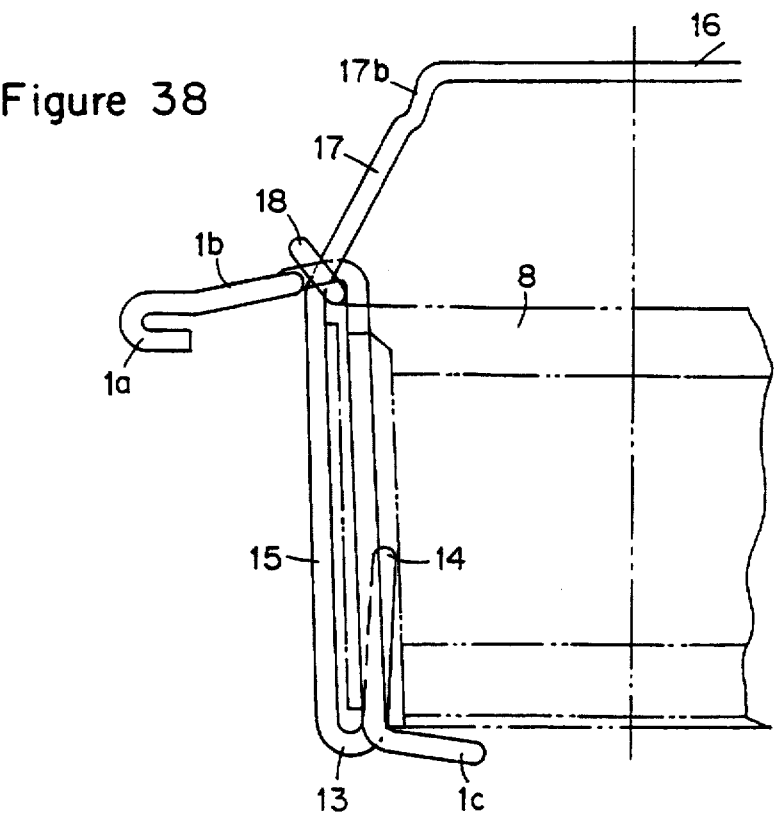

FIG. 38 describes an example the bottle grip in side view, when assembled in the device, as described in FIG. 8. The cup (8) catches onto the air conditioner grill through the grip (1) with bending (1a), coinciding part (1b) and the part which catches the cup (1c). The grasping part of the bottle grip connects also along the side wall of the cup, but on it's external side, and catches onto the cup through a groove at the bottom of the cup. The double edged hook, used to establish the circumferance of the arms (16) can move up until point (17b). A slight bending in area (17b) allows the locking of the hook in a steady manner.

FIGS. 38a and 38b depict in detail the grip (1) of FIG. 38. The grip (1) is made of a partially flexible metal wire, and includes an area (1a) wrapping around the grill (3) (not shown). The area of grip (1c) is an "L" shape and is used for holding the cup (2) on top of the grip. Between areas (1a) and 1(c) is coinciding part (1b).

FIG. 39 describes in side view another example of assembly of the same bottle grip in the device, according to the invention. This figure describes assembly of the bottle grip in the device similar to that exemplified and described in FIGS. 22–12.

FIG. 40 describes in side view a possibility of firm and steady grasping of the air conditioner grill bar (4) with the connecting body. In comparison of this figure to FIG. 12, FIG. 12 has only a grip (1), and in this figure, another grip (20) is added, which presses the air conditioner grill (3) from the opposite (bottom) side. The combination between the upper and lower grips creates a firm and steady crip of the connecting body onto the air conditioner grill.

FIG. 41 describes in over view the mode described in FIG. 40.

The four following figures describe the two grips (1) and (20) which were described in FIGS. 40 and 41 is side view and over view.

FIG. 42 describes the grip (1) in side view.

FIG. 43 describes the grip (1) in over view.

FIG. 44 descibes the grip (20) in side view.

FIG. 45 describes the grip (20) in over view.

I claim:

1. A device for cooling a drink container with cool air entering a cabin area of a vehicle through an air conditioner grill in communication with an air conditioner of the vehicle, comprising a grip which grips onto the air conditioner grill; a cup connected to the grip and which holds the drink container; wherein the grip is made of a wire of predetermined shape with sufficient flexibility such that said shape remains unaltered by the weight of the container but is manually bendable in predetermined areas for exact adjustment of the container to a desired angle and position adjacent the air conditioner grill, and wherein the wire includes a (1) gripping portion in a "U" shaped configuration which is to be wrapped around the air conditioner grill, (2) an adjustment portion which is bendable for adjusting the can to an optimal position, and (3) a holding portion which is connected to the cup, wherein the cup includes a side wall having a plurality of openings allowing cold air currents from the air conditioner to thermally contact and cool the drink container, wherein said adjustment portion, in side elevational view, includes at least two connected wire portions forming a predetermined angle with each other which is spaced elevationally vertically from the gripping portion.

2. A device according to claim 1 wherein the wire is metal wrapped with a plastic material.

3. A device according to claim 1, wherein the gripping portion is made up of two parallel bends formed in a "U" shape of each of two ends of the metal wire.

4. A device according to claim 1 wherein the holding portion in the metal wire is made up of two parallel bends in an "L" shape in elevational view.

5. A device according to claim 4 wherein it is possible to change the length of the arms, or the angle of said "L" shape when necessary.

6. The device according to claim 1, wherein said gripping, adjustment and holding portions are made of one continuous length of wire.

7. The device of claim 6, wherein said gripping portion of "U" shape is defined by respective opposite ends of said wire, resulting in a pair of said "U" shaped gripping portions.

8. The device of claim 7, wherein each gripping portion has a horizontal section connected to the adjustment portion, the adjustment portion including a pair of vertical sections connected to each other through another horizontal section of wire, one of the vertical sections being connected to the horizontal section of the gripping portion, the other vertical section being connected to a vertical portion of the holding portion.

9. The device of claim 7, wherein each gripping section has a horizontal section connected to the adjustment portion, the adjustment portion including an angled section forming an obtuse angle, in elevational view, with said horizontal section, said angled section connected to a generally vertically extending section to form an acute angle therewith in elevational view, said generally vertically extending section joining a vertical section of the holding portion.

* * * * *